United States Patent
Terayama

(10) Patent No.: US 8,255,104 B2
(45) Date of Patent: Aug. 28, 2012

(54) VEHICLE DRIVE CONTROL SYSTEM

(75) Inventor: Yoshito Terayama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1105 days.

(21) Appl. No.: 12/142,192

(22) Filed: Jun. 19, 2008

(65) Prior Publication Data
US 2008/0319619 A1 Dec. 25, 2008

(30) Foreign Application Priority Data
Jun. 21, 2007 (JP) ................................ 2007-164070

(51) Int. Cl.
*B60L 11/00* (2006.01)
(52) U.S. Cl. ........... 701/22; 180/65.1; 180/242; 701/51; 701/58
(58) Field of Classification Search ............. 180/65.245, 180/65.1, 242; 701/22, 54, 55, 56, 58, 59
See application file for complete search history.

(56) References Cited

U.S. PATENT DOCUMENTS

| | | | | |
|---|---|---|---|---|
| 5,009,279 A | * | 4/1991 | Matsuda ........................ | 180/197 |
| 5,148,883 A | * | 9/1992 | Tanaka et al. ................. | 180/165 |
| 5,164,903 A | * | 11/1992 | Lin et al. ........................ | 701/89 |
| 5,453,930 A | * | 9/1995 | Imaseki et al. ................. | 701/22 |
| 5,465,806 A | * | 11/1995 | Higasa et al. .................. | 180/165 |
| 5,939,846 A | * | 8/1999 | Young et al. .................... | 318/98 |
| 5,959,420 A | | 9/1999 | Boberg et al. | |
| 6,422,333 B1 | * | 7/2002 | Kjaer et al. .................... | 180/197 |
| 6,909,959 B2 | * | 6/2005 | Hallowell ....................... | 701/88 |

FOREIGN PATENT DOCUMENTS

| | | |
|---|---|---|
| JP | 05-076106 | 3/1993 |
| JP | 2003-333707 | 11/2003 |
| JP | 2004-120882 | 4/2004 |

* cited by examiner

*Primary Examiner* — Khoi Tran
*Assistant Examiner* — Stephen Holwerda
(74) *Attorney, Agent, or Firm* — Rankin, Hill & Clark LLP

(57) ABSTRACT

A vehicle drive control apparatus is capable of setting characteristics of a target drive torque so as to provide a vehicle operation that is extremely smooth and comfortable for an operator. The control apparatus individually determines individual critical torque values of a plurality of drive sources and determines a total critical torque on the basis of the total of the individual critical torque values, whereby a combined critical torque capable of being output by the drive sources as a whole is determined. A ratio of the target drive torque to the combined critical torque is set by a target drive torque setting part, thereby setting the target drive torque as a whole for the vehicle corresponding to an action of the operator and behavior of the vehicle.

2 Claims, 5 Drawing Sheets

VEHICLE DRIVE CONTROL SYSTEM

FIELD OF THE INVENTION

The present invention relates to a vehicle drive control system for controlling a drive torque, generated by a plurality of drive sources for driving a plurality of wheels, to be a target drive torque (required torque).

BACKGROUND OF THE INVENTION

Vehicle drive control apparatuses for adjusting a drive torque in response to an operating state of a vehicle having a plurality of motors are known in the art, as disclosed, for example, in Japanese Patent Application Laid-Open Publication No. 2003-333707 (JP 2003-333707 A).

The vehicle drive control apparatus disclosed in JP 2003-333707 A has a motor for driving left and right front wheels and a motor for driving left and right rear wheels in a vehicle, and controls the two motors (drive sources). A required torque demanded by the operator is distributed to the two motors in a predetermined distribution ratio. Each of the motors outputs a drive torque according to the distribution ratio. The required torque is determined from a vehicle speed and an accelerator position on the basis of a predetermined required torque setting map.

There are vehicles in which separate motors drive each of the four wheels. The technique described in JP 2003-333707 A can also be considered for application in vehicles of this type; i.e., a required torque is set according to a required torque setting map, and the required torque is distributed to each motor individually in a predetermined distribution ratio.

However, the maximum torque able to be output by each motor alone (individual critical torque) changes according to the rate of rotation of each motor; i.e., according to the vehicle operation state. The required torque merely is distributed to the plurality of motors in a predetermined distribution ratio. In a case in which the required torque distributed to a single motor exceeds the individual critical torque, the distributed required torque cannot be output. Complications are accordingly presented when setting a required torque suitable to the vehicle operating state.

In a hypothetical example, the rates at which the left and right motors rotate are the same (when the vehicle is moving directly forward), and the following circumstance can be considered when the required torque setting map is created.

When the vehicle turns, the rate of rotation of the outer turning wheel will be greater than the rate of rotation of the wheels when the vehicle moves directly forward. The rate of rotation of the motor for driving the outer turning wheel will also be greater; therefore, the individual critical torque able to be output by the motor will decrease. Consequently, the required torque cannot always be output up to the maximum value. Therefore, it is possible that the torque may not increase from an intermediate position before the accelerator has been fully depressed. The same is true when the wheels are rotating while disengaged from the motor.

In another hypothetical example, the rates of rotation of the left and right motors are different (when the vehicle is turning), and the following circumstance can be considered when a required torque setting map is created to correspond with the rate of rotation of the outer turning wheel.

When a vehicle is moving directly forward, the rate of rotation of the wheels is less than the rate of rotation of the outer turning wheel when the vehicle is turning. Therefore, the individual critical torque able to be output by a motor when the vehicle is moving directly forward should be greater than the individual critical torque able to be output by a motor for driving an outer turning wheel.

However, the required torque setting map is created in correspondence with the rate of rotation of the outer turning wheel, as described above. Consequently, the required torque setting may end up being smaller than the individual critical torque when the vehicle is moving directly forward. Therefore, the torque may end up being limited before reaching the individual critical torque, regardless of the fact that when the vehicle is moving directly forward, inherently, the motor is actually capable of outputting a value that is greater than the maximum required torque of the required torque setting map.

Complications will thus be presented when setting the individual critical torque for each of the motors to the optimal value according to the vehicle operating state; therefore, the operator may experience an unpleasant sensation.

SUMMARY OF THE INVENTION

It is therefore an object of the present invention to allow target drive torque characteristics to be set such that the operator perceives a considerable smoothness, free from unpleasant sensations.

According to a first aspect of the present invention, there is provided a vehicle drive control apparatus for controlling a drive torque, generated by a plurality of drive sources for driving a plurality of wheels, to be a target drive torque. The control apparatus comprises a rotation rate detector for detecting a rate of rotation of the drive sources individually and an individual critical torque setting part for individually setting, on the basis of the rate of rotation of each of the drive sources, an individual critical torque to be output by each of the drive sources as an individual entity. The control apparatus further comprises a total critical torque setting part for setting, on the basis of a total of the individual critical torque values, a total critical torque to be output by the drive sources as a whole and a target drive torque ratio setting part for setting a ratio of a target drive torque of the drive sources as a whole in relation to the total critical torque in accordance with an action of an operator or a behavior of a vehicle, or both.

In this arrangement, each individual critical torque of the drive sources is determined individually, and determining the total critical torque based on the total of the individual critical torque values makes it possible to determine a combined critical torque able to be output by all the drive sources as a whole. The ratio of the target drive torque to the combined critical torque (output ratio) is set by the target drive torque ratio setting part, thereby making it possible to set the target drive torque of the entire vehicle in response to the actions of the operator and the behavior of the vehicle. It is accordingly possible for the torque to be extracted in just proportion up to the critical values output by the drive sources within the range of the overall target drive torque of the vehicle, as set in advance. Therefore, target drive torque characteristics can be set so that the operator perceives a considerable smoothness, free from unpleasant sensations.

Preferably, the control apparatus further comprises a vehicle speed sensor for detecting a vehicle speed, and an accelerator position sensor for detecting an accelerator position, the target drive torque ratio setting part having a weight-setting part for weighting an accelerator position ratio on the basis of the vehicle speed or the accelerator position, or both.

The ratio of the target drive torque defines the characteristics of the overall target drive torque output by the vehicle. The torque characteristics can be set according to the weighted accelerator position ratio. Altering the weighting of the accelerator position accordingly makes it possible to change the characteristics of the target drive torque corresponding to the accelerator position. Consequently, the torque characteristics for a case in which, e.g., one power source is provided, can also be readily used for the torque characteristics of a vehicle having a plurality of drive sources.

Desirably, the control apparatus further comprises a vehicle speed sensor for detecting a vehicle speed, and an accelerator position sensor for detecting an accelerator position, the target drive torque ratio setting part causing the target drive torque to decrease as the vehicle speed increases, and the target drive torque to increase as the accelerator position increases. With this arrangement, the target drive torque can be set at an optimal value so as to correspond to the vehicle speed and the accelerator position, and target drive torque characteristics can be set so that the operator perceives a considerable smoothness, free from unpleasant sensations.

According to a second aspect of the present invention, there is provided a vehicle drive control method for controlling a drive torque, generated by a plurality of drive sources for driving a plurality of wheels, to be a target drive torque, which method comprises the steps of individually detecting a rate of rotation of the drive sources; individually setting, on the basis of the rate of rotation of each of the drive sources, an individual critical torque to be output by each of the drive sources on an individual basis; setting, on the basis of the total of the individual critical torque values, a total critical torque to be output by the drive sources as a whole; and setting a ratio of a target drive torque of the drive sources as a whole to the total critical torque, in response to an action of an operator or a behavior of a vehicle, or both.

In this method, each individual critical torque of the drive sources is individually determined, and determining the total critical torque based on the total of the individual critical torque values makes it possible to determine a combined critical torque able to be output by all the drive sources as a whole. The ratio of the target drive torque to the combined critical torque (output ratio) is set by the target drive torque ratio setting part, thereby making it possible to set by an uncomplicated method the target drive torque of the entire vehicle in response to the actions of the operator and the behavior of the vehicle.

Preferably, the target drive torque ratio setting step comprises weighting an accelerator position ratio on the basis of a vehicle speed detected by a vehicle speed sensor, or an accelerator position detected by an accelerator position sensor, or both.

Desirably, the target drive torque ratio setting step comprises a step whereby the target drive torque decreases as a vehicle speed detected by a vehicle speed sensor increases, and the target drive torque increases as an accelerator position detected by an accelerator position sensor increases.

BRIEF DESCRIPTION OF THE DRAWINGS

Certain preferred embodiments of the present invention will be described in detail below, by way of example only, with reference to the accompanying drawings, in which.

DETAILED DESCRIPTION OF THE PREFERRED EMBODIMENTS

Figure 1:
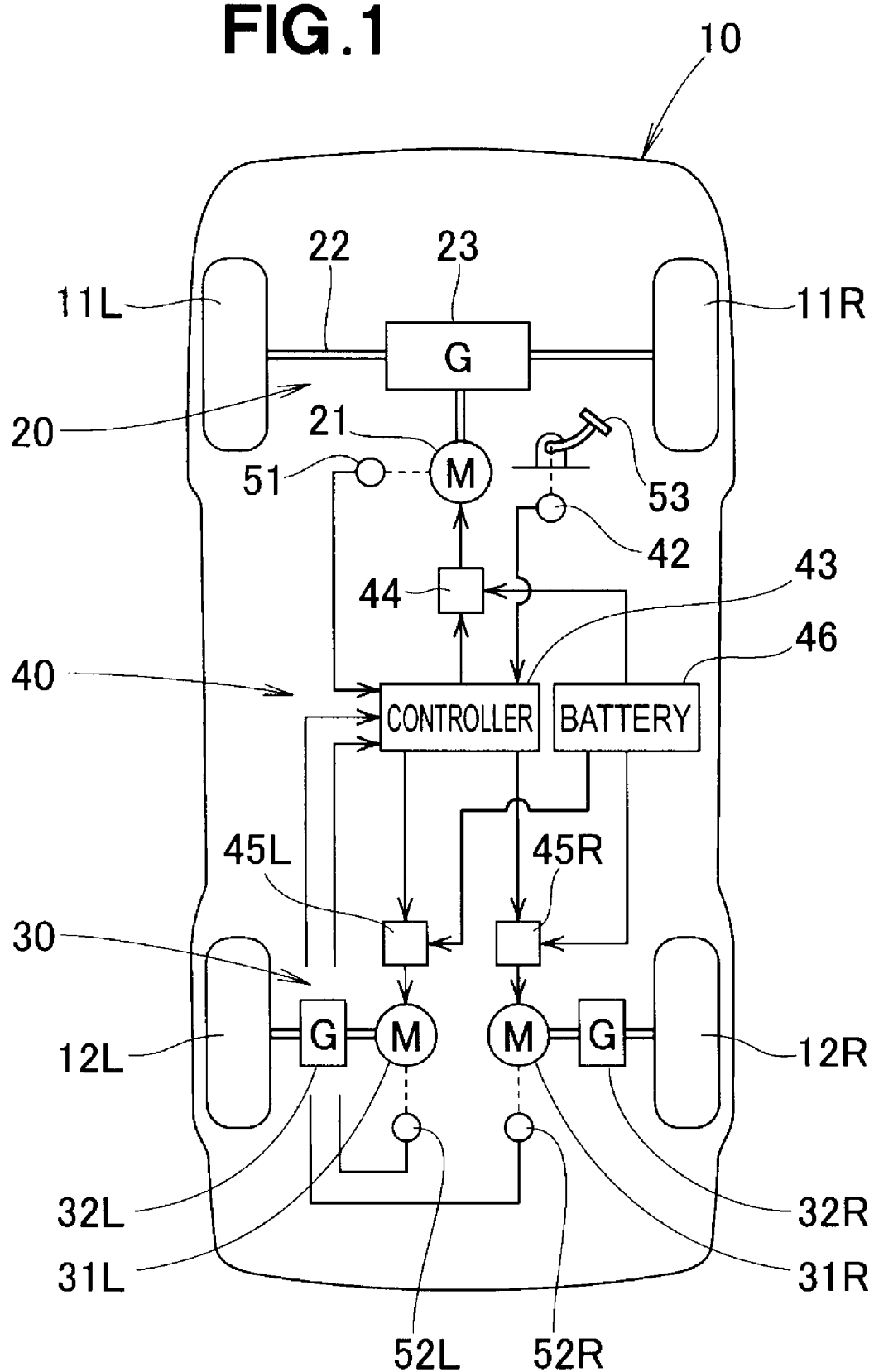
FIG. 1 is a schematic top plan view showing a vehicle employing a vehicle drive control apparatus according to the present invention.

As shown in FIG. 1, a vehicle 10 is a four-wheel-drive vehicle of a type whereby left and right wheels 11L, 11R, and left and right rear wheels 12L, 12R are driven. The vehicle 10 has a front-wheel-drive system 20 for driving the left and right front wheels 11L, 11R; a rear-wheel-drive system 30 for driving the left and right rear wheels 12L, 12R; and a vehicle drive control apparatus 40 for driving and controlling the front- and rear-wheel-drive systems 20, 30.

The front-wheel-drive system 20 has a front-wheel-drive motor 21, and a front-side gear mechanism 23 (differential gear 23) for transmitting drive torque generated by the front-wheel-drive motor 21 to the left and right front wheels 11L, 11R via an axle 22.

The rear-wheel-drive system 30 has a left rear-wheel motor 31L, a right rear-wheel motor 31R, a left rear-side gear mechanism 32L for transmitting drive torque generated by the left rear-wheel motor 31L to the left rear-wheel 12L, and a right rear-side gear mechanism 32R for transmitting drive torque generated by the right rear-wheel motor 31R to the right rear wheel 12R.

The motors 21, 31L, 31R are drive sources having electrical motors. Hereinafter the front-wheel-drive motor 21 will be referred to as the "front motor 21," the left rear-wheel-motor 31L will be referred to as the "left rear motor 31L," and the right rear-wheel-motor 31R will be referred to as the "right rear motor 31R."

Figure 2:
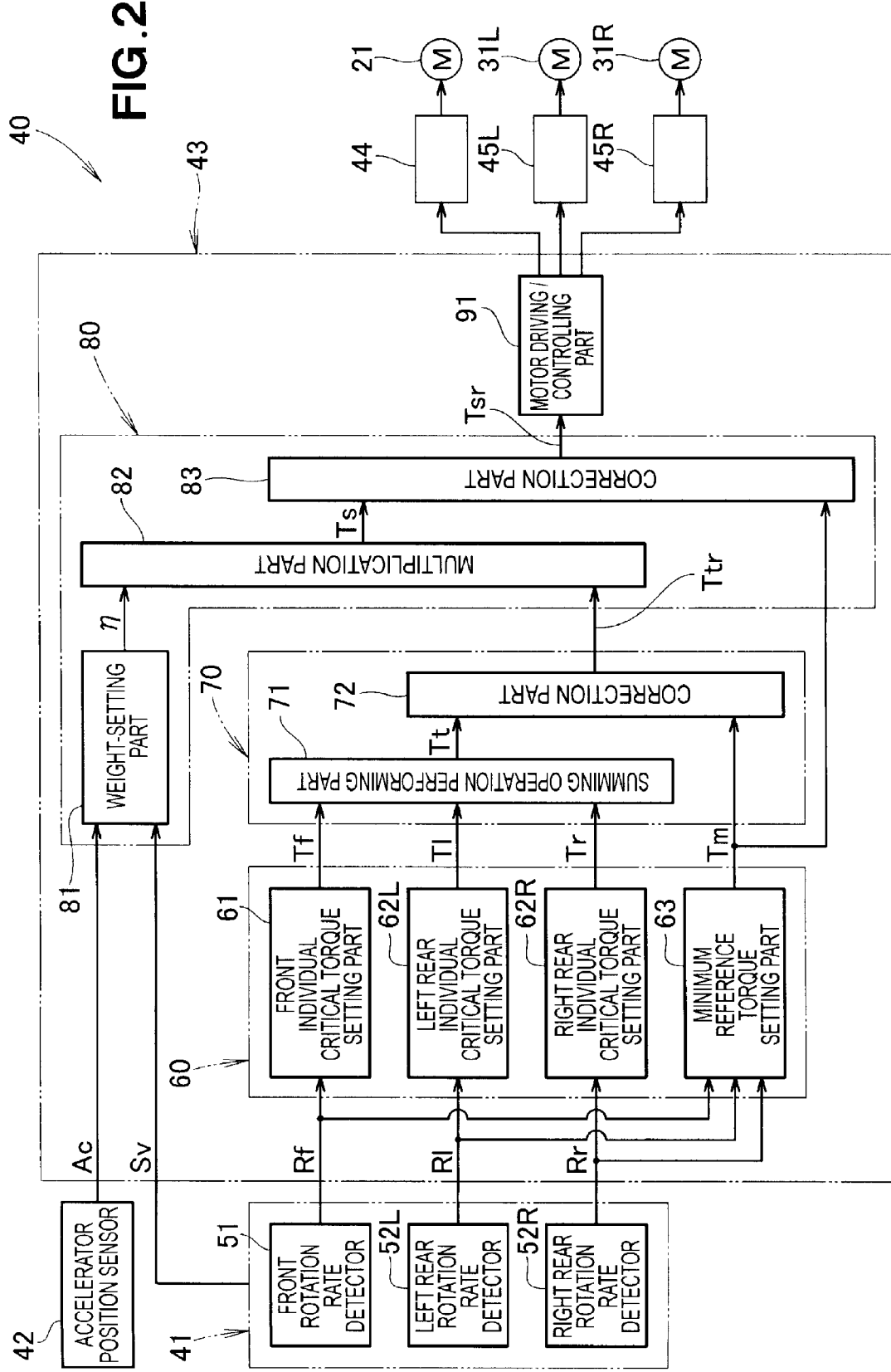
FIG. 2 is a block diagram showing the circuitry of the drive control apparatus shown in FIG. 1.

As shown in FIGS. 1 and 2, the vehicle drive control apparatus 40 performs a control so that the drive torque generated by the plurality of motors 21, 31L, 31R for driving the plurality of wheels 11L, 11R, 12L, 12R will be a target drive torque Tsr. The vehicle drive control apparatus 40 hereinafter will be referred to simply as the "control apparatus 40." The control apparatus 40 has a vehicle speed sensor 41, an accelerator position sensor 42, a controller 43, and driver circuits 44, 45L, 45R.

The vehicle speed sensor 41 detects the travel speed Sv (vehicle speed Sv) of the vehicle 10, and has for example a plurality of rotation rate detectors 51, 52L, 52R. The plurality of rotation rate detectors 51, 52L, 52R detects the rate of rotation Rf, Rl, Rr of the motors 21, 31L, 31R individually. The front rotation rate detector 51 detects the rate of rotation Rf of the front motor 21. The left rear rotation rate detector 52L detects the rate of rotation Rl of the left rear motor 31L. The right rear rotation rate detector 52R detects the rate of rotation Rr of the right rear motor 31R. The vehicle speed sensor 41 can determine the vehicle speed Sv indirectly on the basis of the rates of rotation Rf, Rl, Rr detected by the rotation rate detectors 51, 52L, 52R. The vehicle speed sensor 41 described above may be referred to as a "vehicle behavior detector" for emitting a signal corresponding to the behavior of the vehicle 10. The vehicle speed sensor 41 may also be configured to be able to determine the vehicle speed Sv directly.

The accelerator position sensor 42 detects the accelerator position Ac corresponding to the degree to which an accelerator pedal 53 (FIG. 1) has been depressed by an operator. The accelerator position Ac increases as the degree to which the accelerator pedal 53 is depressed increases. The accelerator position Ac here expresses the rate at which the drive torque of the drive source motors 21, 31L, 31R is increased.

Such an accelerator position sensor 42 detects the degree to which the operator arbitrarily performs an action that causes the vehicle 10 to accelerate, and therefore can be described as an "operator action detector" for emitting a signal corresponding to an action performed by the operator.

The controller 43 receives the detection signals Sv, Ac from the vehicle speed sensor 41 and the accelerator position sensor 42, and drives and controls each of the motors 21, 31L, 31R independently by emitting a control signal to each of the driver circuits 44, 45L, 45R. Each of the driver circuits 44, 45L, 45R supplies a drive current from a battery 46 (see FIG. 1) to each of the motors 21, 31L, 31R in response to the control signal of the controller 43.

The controller 43 is described in more detail below.

As shown in FIGS. 1 and 2, the controller 43 has a part 60 for setting an individual critical torque, a part 70 for setting total critical torque, a part 80 for setting a target drive torque ratio, and a part 91 for driving and controlling a motor.

The individual critical torque setting part 60 sets individual critical torque values Tf, Tl, Tr that can be output individually (independently) by the motors 21, 31L, 31R at the rates of rotation Rf, Rl, Rr of the motors 21, 31L, 31R. The individual critical torque setting part 60 has, for example, a part 61 for setting a front individual critical torque, a part 62L for setting a left rear individual critical torque, a part 62R for setting a right rear individual critical torque, and a part 63 for setting a minimum reference torque.

The front individual critical torque setting part 61 sets the individual critical torque Tf (front individual critical torque Tf) able to be output by the front motor 21 alone at the rate of rotation Rf of the front motor 21 as detected by the front rotation rate detector 51.

The left rear individual critical torque setting part 62L sets the individual critical torque Tl (left rear individual critical torque Tl) able to be output by the left rear motor 31L alone at the rate of rotation Rl of the left rear motor 31L as detected by the left rear rotation rate detector 52L.

The right rear individual critical torque setting part 62R sets the individual critical torque Tr (right rear individual critical torque Tr) able to be output by the right rear motor 31R alone at the rate of rotation Rr of the right rear motor 31R as detected by the right rear rotation rate detector 52R.

The minimum reference torque setting part 63 sets the minimum reference torque Tm at the rates of rotation Rf, Rl, Rr when the accelerator pedal 53 is not depressed; i.e., when the degree to which the accelerator pedal 53 is depressed is zero.

Figure 3:
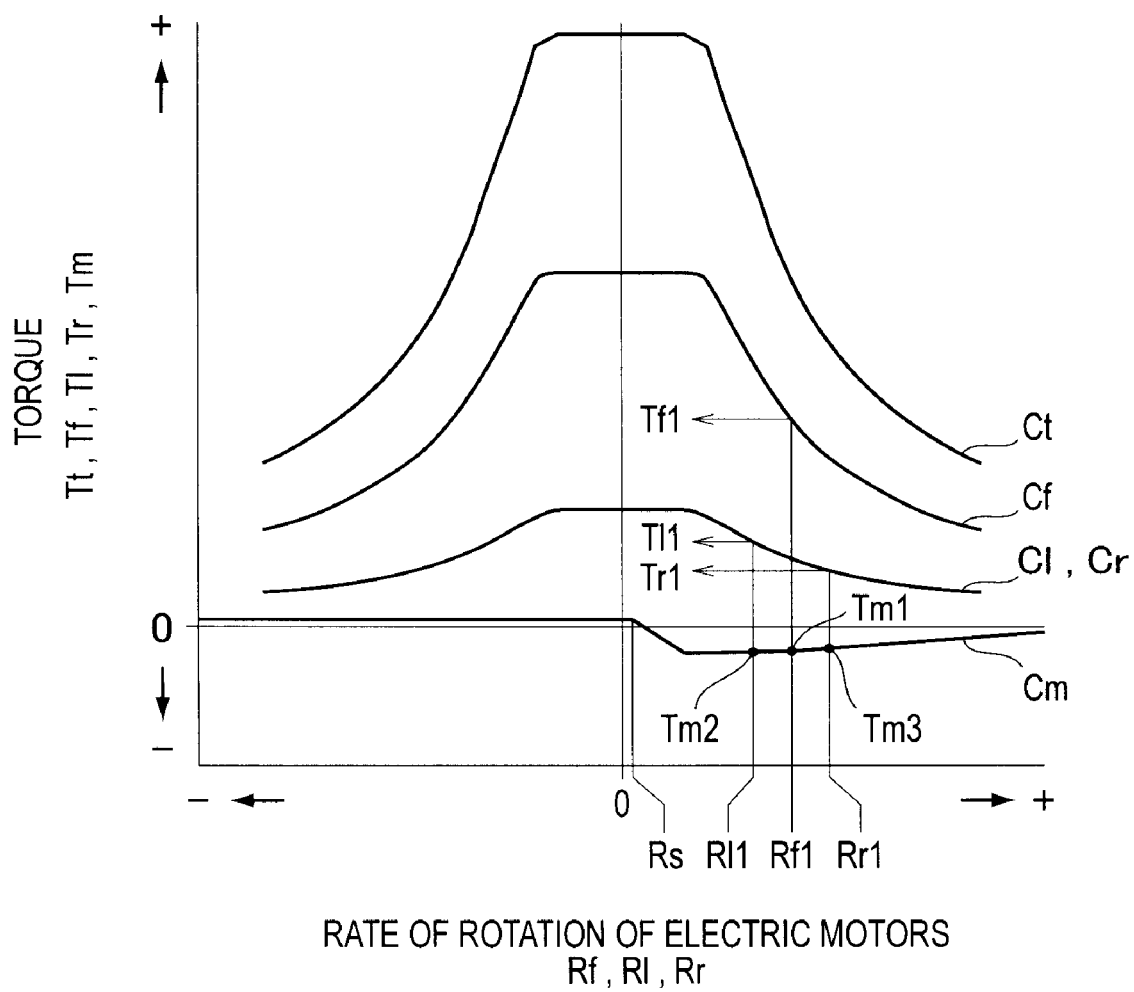
FIG. 3 illustrates a torque setting map used by the minimum reference torque setting part and the individual critical torque setting parts shown in FIG. 2.

The individual critical torque setting parts 61, 62L, 62R and the minimum reference torque setting part 63 set the torque values Tf, Tl, Tr, Tm using, for example, the torque setting map shown in FIG. 3.

FIG. 3 shows a torque setting map used by the individual critical torque setting parts 61, 62L, 62R and the minimum reference torque setting part 63 shown in FIG. 2. In the torque setting map, the horizontal axis shows the rates of rotation of the electric motors 21, 31L, 31R and the vertical axis shows the torque, with the torque values Tf, Tl, Tr, Tt, Tm being set in response to the rates of rotation Rf, Rl, Rr. The map is shown using curves Cf, Cl, Cr, Ct, Cm. The curves Cf, Cl, Cr, Ct, Cm are described in detail below.

On the horizontal axis, when the rate of rotation is zero the motor is in a stopped state; when the rate of rotation has a positive value the motor is in a state of forward rotation; and when the rate of rotation has a negative value the motor is in a state of reverse rotation.

Curve Cf is a front individual critical torque characteristics curve for showing the characteristics of the front individual critical torque Tf corresponding to the rate of rotation Rf of the front motor 21. The front individual critical torque setting part 61 uses the front individual critical torque characteristics curve Cf as a guide in setting the front individual critical torque Tf.

Curve Cl is a left rear individual critical torque characteristics curve for showing the characteristics of the left rear individual critical torque Tl corresponding to the rate of rotation Rl of the left rear motor 31L. The left rear individual critical torque setting part 62L uses the left rear individual critical torque characteristics curve Cl as a guide in setting the left rear individual critical torque Tl.

Curve Cr is a right rear individual critical torque characteristics curve for showing the characteristics of the right rear individual critical torque Tr corresponding to the rate of rotation Rr of the right rear motor 31R. The characteristics of the right rear individual critical torque characteristics curve Cr are the same as the characteristics of the left rear individual critical torque characteristics curve Cl. The right rear individual critical torque setting part 62R uses the right rear individual critical torque characteristics curve Cr as a guide in setting the right rear individual critical torque Tr.

Curve Ct is a total critical torque curve for showing the characteristics of the left rear individual critical torque characteristics curve Cl and the characteristics of the right rear individual critical torque characteristics curve Cr together with the characteristics of the front individual critical torque characteristics curve Cf; i.e., the characteristics of a total critical torque Tt. The total critical torque curve Ct shows the characteristics of a case in which the rates of rotation Rf, Rl, Rr of all the motors 21, 31L, 31R are equal; i.e., a case in which the vehicle 10 is moving directly forward.

The critical torque characteristics curves Cf, Cl, Cr, Ct are substantially in the shape of a mountain. When the rates of rotation Rf, Rl, Rr are at 0 (when the motor is stopped) or in the vicinity of 0, the critical torque values Tf, Ti, Tr, Tt are at maximum; i.e., the start-up torque values of the motors are large.

The torque characteristics based on the front individual critical torque characteristics curve Cf have a magnitude 2 to 3 times greater than the torque characteristics based on the left and right rear individual critical torque characteristics curves Cl, Cr.

Curve Cm is a curve representing a minimum reference torque common to all the motors 21, 31L, 31R. The minimum reference torque curve Cm corresponds to each of the rates of rotation Rf, Rl, Rr individually. The minimum reference torque setting part 63 uses the minimum reference torque curve Cm as a guide in setting the minimum reference torque values Tm of the motors 21, 31L, 31R individually.

A description shall now be provided in further detail, with a value Rs, at which the rate of rotation slightly exceeds 0, being used as a reference. The characteristics of the minimum reference torque curve Cm are such that at values less than Rs, the minimum reference torque Tm is set at a slightly positive value, and at values greater than Rs, the reference torque Tm is set at a slightly negative value.

The following is evident from the minimum reference torque curve Cm.

When the motor is in forward rotation without the accelerator pedal 53 having been depressed, the reference torque Tm is at a predetermined negative value. A regenerative circuit (not shown) is operated, whereby the motor is changed to a regenerating state.

When the motor is in reverse rotation without the accelerator pedal 53 having been depressed, the reference torque Tm is at a predetermined slightly positive value. A creep torque circuit (not shown) is operated, whereby the motor changes to a state wherein creep torque is generated. Creep torque refers to torque capable of causing the vehicle 10 to advance at an extremely slow speed.

There follows a description of an example in which torque values are set using the torque setting map shown in FIG. 3. For example, a case is assumed wherein the vehicle 10 is turning to the left, taking the rate of rotation of the front motor 21 to be Rf1, the rate of rotation of the left rear motor 31L to be Rl1, and the rate of rotation of the right rear motor 31R to be Rr1.

Using Rf1 as the rate of rotation of the front motor 21, a front individual critical torque Tf1 is set using the front individual critical torque characteristics curve Cf (the front individual critical torque setting guide Cf), and a minimum reference torque Tm1 is set using the minimum reference torque curve Cm (the minimum reference torque setting guide Cm).

Using Rl1 as the rate of rotation of the left rear motor 31L, which is provided to the inner turning side, a left rear individual critical torque Tl1 is set using the left rear individual critical torque characteristics curve Cl (the left rear individual critical torque setting guide Cl), and a minimum reference torque Tm2 is set using the minimum reference torque curve Cm.

Using Rr1 as the rate of rotation of the right rear motor 31R, which is provided to the outer turning side, a right rear individual critical torque Tr1 is set using the right rear individual critical torque characteristics curve Cr (the right rear individual critical torque setting guide Cr), and a minimum reference torque Tm3 is set using the minimum reference torque curve Cm.

The torque values Tf1, Tl1, Tr1, and Tm1 to Tm3 can thus be set. The description of the torque setting map shown in FIG. 3 is accordingly complete.

As shown in FIG. 2, the total critical torque setting part 70 sets a total critical torque Ttr able to be output by the plurality of motors 21, 31L, 31R as a whole, based on the sum of the individual critical torque values Tf, Tl, Tr. The total critical torque setting part 70 has, for example, a summator 71, and a correction part 72.

The summator 71 determines a total Tt of the three individual critical torque values Tf, Tl, Tr set by the front individual critical torque setting part 61, the left rear individual critical torque setting part 62L, and the right rear individual critical torque setting part 62R (Tt=Tf+Tl+Tr). The total value Tt (total torque Tt) is the basis of the total critical torque Ttr. For example, in the case of the above example of setting torque, the result will be Tt=Tf1+Tl1+Tr1.

The correction part 72 subtracts the three minimum reference torque values Tm set by the minimum reference torque setting part 63 from the total torque Tt determined by the summator 71, and thereby changes the total torque Tt to the Ttr value; i.e., Ttr=Tt−(3×Tm). For example, in the above torque setting example, the operation will be Ttr=Tt−(Tm1+Tm2+Tm3). The value Ttr corrected in this manner is the total critical torque. The total critical torque setting part 70 outputs the total critical torque Ttr.

The correction part 72 for correcting the total torque Tt is optionally included, and can be provided as circumstances demand. When the correction part 72 is not used, the total critical torque Ttr output from the total critical torque setting part 70 remains at the value of the total torque Tt (Ttr=Tt).

The minimum reference torque curve Cm shown in FIG. 3 can be used as a curve for setting a minimum reference torque Tm with respect to the total torque Tt (modification). In the modification, the minimum reference torque Tm is set on the basis of the value of the vehicle speed Sv detected by the vehicle speed sensor 41. The value used for the vehicle speed Sv is, for example, the average value of the rates of rotation Rf, Rl, Rr of the motors 21, 31L, 31R. In the modification, the horizontal axis of the torque setting map shown in FIG. 3 may be the vehicle speed only when a minimum reference torque Tm is determined on the basis of the vehicle speed Sv.

In the modification, in a case in which the motor is rotating in the forward direction without the accelerator pedal 53 having been depressed, the reference torque Tm is set at a predetermined negative value when the value of the vehicle speed Sv is positive, as shown by the minimum reference torque curve Cm in FIG. 3. Setting the reference torque Tm at a negative value results in the same action as when the brakes are operated when the vehicle is in motion. In other words, a braking action is exhibited in the same manner as when engine brakes are operated in a conventional engine-powered vehicle.

When one minimum reference torque Tm is set in relation to the total torque Tt, the total critical torque Ttr will be Ttr=Tt−Tm.

As shown in FIG. 2, the target drive torque ratio setting part 80 sets a ratio $\eta$ of the target drive torque Tsr of all of the motors 21, 31L, 31R to the total critical torque Ttr (accelerator position ratio $\eta$), in response to either an action made by an operator or the behavior of the vehicle 10 (see FIG. 1), or both. The target drive torque ratio setting part 80 has, for example, a weight-setting part 81, a multiplication part 82, and a correction part 83.

Figure 4:
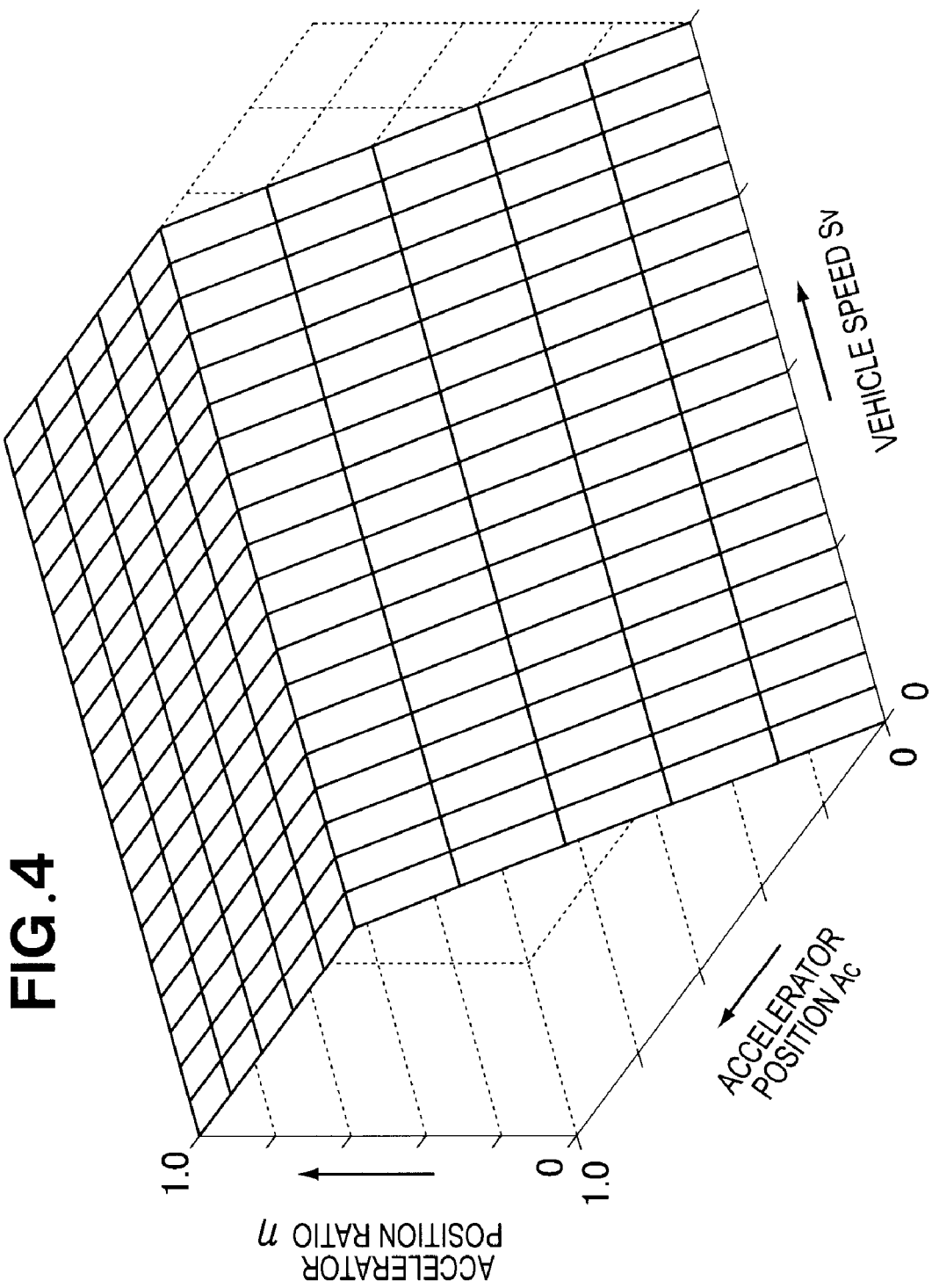
FIG. 4 is a view showing a weighting-setting map used by the weight-setting part shown in FIG. 2.

The weight-setting part 81 applies a weighting to the accelerator position ratio $\eta$ on the basis of either the vehicle speed Sv or the accelerator position Ac, or both, and sets the weighting using, e.g., the weighting-setting map shown in FIG. 4.

FIG. 4 is a diagram of a weighting-setting map used by the weight-setting part 81 shown in FIG. 2. The weighting-setting map is a three-dimensional map wherein the x-axis is the vehicle speed Sv, the y-axis is the accelerator position Ac, and the z-axis (vertical axis) is the accelerator position ratio $\eta$.

The vehicle speed Sv on the x-axis starts on the left side of the drawing at 0 and increases in value towards the right side of the drawing.

The accelerator position Ac on the y-axis has a range from a minimum of 0 to a maximum of 1.0. When Ac=0, the accelerator pedal 53 (see FIG. 1) is in a state of not being depressed; i.e., a state wherein the degree to which the accelerator pedal 53 is depressed is zero. When Ac=1.0, the accelerator pedal 53 is in a state of being maximally depressed; i.e., a state wherein the degree to which the accelerator pedal 53 is depressed is at the maximum.

The accelerator position ratio $\eta$ on the z-axis has a range from a minimum of 0 to a maximum of 1.0.

The weighting-setting map shown in FIG. 4 is used to set the accelerator position ratio $\eta$ solely in response to the action of the operator. It is evident from the weighting-setting map that the accelerator position ratio $\eta$ changes in response to the accelerator position Ac, irrespective of the value of the vehicle speed Sv. For example, when Ac=0, $\eta$=0. When the value of Ac increases from 0 to 0.5, the value of $\eta$ increases from 0 to 1.0 in proportion to Ac. When the value of Ac increases from 0.5 to 1.0, the value of $\eta$ is constant at 1.0.

The characteristics of the weighting-setting map shown in FIG. 4 may, in addition to the characteristics for setting the accelerator position ratio $\eta$ solely in response to the operator action (solely the accelerator position Ac) as described above, be characteristics for setting the accelerator position ratio $\eta$ solely in response to the behavior of the vehicle 10 (solely the vehicle speed Sv), or characteristics for setting the accelerator position ratio η in response to both the action of the operator and the behavior of the vehicle 10.

The accelerator position ratio η can thus be weighted on the basis of the vehicle speed Sv and the accelerator position Ac. The description of the weighting-setting map shown in FIG. 4 is now complete.

As shown in FIG. 2, the multiplication part 82 multiplies the total critical torque Ttr, which has been set by the total critical torque setting part 70, by the accelerator position ratio η, which has been set by the weight-setting part 81, whereby a target drive torque Ts of all of the motors 21, 31L, 32R is determined (Ts=Ttr×η).

The correction part 83 adds the three minimum reference torque values Tm set by the minimum reference torque setting part 63 to the target drive torque Ts determined by the multiplication part 82, and thereby changes the target drive torque Ts to the value of Tsr; i.e., Tsr=Ts+(3×Tm). Using the above example, the value of Tsr is set to Ts+(Tm1+Tm2+Tm3). The target drive torque output from the target drive torque ratio setting part 80 will be Tsr.

The correction part 83 for correcting the value of the target drive torque Ts is optionally included, and can be provided as circumstances demand. When the correction part 83 is not used, the target drive torque Tsr output from the target drive torque ratio setting part 80 remains at the value of Ts (Tsr=Ts).

The motor driving/controlling part 91 performs a control so that the drive torque generated by the motors 21, 31L, 31R will be the target drive torque Tsr.

Figure 5:
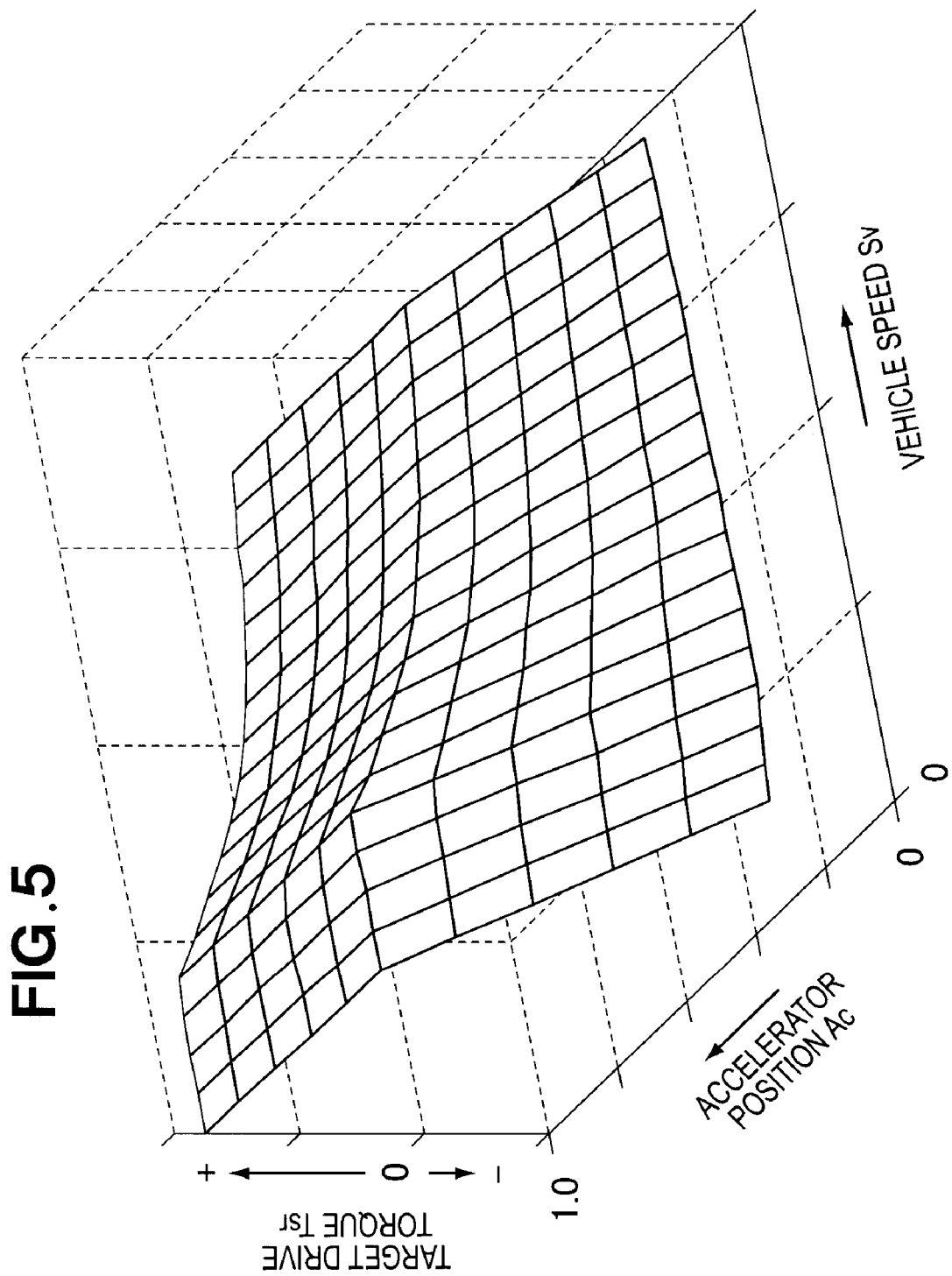
FIG. 5 illustrates an example target drive torque set by the drive control apparatus shown in FIG. 2.

FIG. 5 is a view showing an example in which a target drive torque Tsr is set by the vehicle drive control apparatus 40 (FIG. 2). The characteristics for setting the target drive torque Tsr are three-dimensional characteristics wherein the x-axis is the vehicle speed Sv, the y-axis is the accelerator position Ac, and the z-axis (vertical axis) is the target drive torque Tsr.

The vehicle speed Sv on the x-axis starts on the left side of the drawing at 0 and increases in value towards the right of the drawing.

The accelerator position Ac on the y-axis has a range from a minimum of 0 to a maximum of 1.0. When Ac=0, the accelerator pedal 53 (FIG. 1) is in a state of not being depressed; i.e., a state wherein the degree of to which the accelerator pedal 53 is depressed is zero. When Ac=1.0, the accelerator pedal 53 is in a state of being maximally depressed; i.e., a state wherein the degree to which the accelerator pedal 53 is depressed is at the maximum.

Zero is used on the z-axis as a reference value for the target drive torque Tsr, with the side of the axis above 0 representing positive values and the side of the axis below 0 representing negative values.

It is evident from the setting characteristics diagram shown in FIG. 5 that the target drive torque Tsr is appropriately set in the range corresponding to the critical values Tf, Tl, Tr, output by the motors 21, 31L, 31R. The target drive torque Tsr decreases as the vehicle speed Sv increases, and increases as the accelerator position Ac increases. The setting characteristics diagram shown in FIG. 5 is regarded to be a target drive torque setting map having characteristics for setting the target drive torque Tsr.

As is apparent from the above description, the controller 43 has the maps shown in FIGS. 3 and 4, and can accordingly be regarded to have the target drive torque setting map having the characteristics for setting the target drive torque Tsr as shown in FIG. 5.

Specifically, using the torque setting maps Cf, Cl, Cr, Cm shown in FIG. 3 makes it possible to set the torque values Tf, Tl, Tr, Tm more actively in response to the rates of rotation of the motors 21, 31L, 31R. Consequently, the individual critical torque values Tf, Tl, Tr can be set at the optimal value relative to the state in which the vehicle 10 is operating. As a result, the target drive torque Tsr can be set at the optimal value.

Using the weighting-setting map shown in FIG. 4 makes it possible to weight the accelerator position ratio η more actively in response to the vehicle speed Sv and the accelerator position Ac.

Using the maps in FIGS. 3 and 4 makes it possible to determine the characteristics of the target drive torque Tsr shown in FIG. 5 more actively and less restrictively. It is accordingly possible to set the characteristics of the target drive torque Tsr so that the operator perceives a very smooth and comfortable operation.

The vehicle drive control apparatus 40 is a complicated drive control system for collectively controlling the motors 21, 31L, 31R, but can be readily adapted merely by harmonizing the data of the maps shown in FIGS. 3 and 4 with the operating characteristics of a variety of models of vehicles, so that each vehicle will reach an optimal target drive torque Tsr.

For example, in a four-wheel-drive vehicle, all of the wheels are driven by just one motor (a single motor). The vehicle drive control apparatus 40 of the present invention can be readily adapted to a drive control system for controlling a single motor in a four-wheel-drive vehicle merely by altering the data of the maps shown in FIGS. 3 and 4.

The above description is summarized as follows (see FIGS. 1 and 2).

According to the vehicle drive control apparatus 40 of the present invention, each individual critical torque Tf, Tl, Tr of the drive sources 21, 31L, 31R is determined individually, and determining the total critical torque Ttr based on the total Tt of the individual critical torque values makes it possible to determine a combined critical torque Ttr able to be output by all the drive sources 21, 31L, 31R as a whole. The ratio η (output ratio η) of the target drive torque to the combined critical torque Ttr is set by the target drive torque ratio setting part 80, thereby making it possible to set the target drive torque Tsr of the entire vehicle in response to the actions of the operator and the behavior of the vehicle. It is accordingly possible for the torque to be extracted in just proportion up to the critical values Tf, Tl, Tr output by the drive sources 21, 31L, 31R within the range of the overall target drive torque Tsr of the vehicle 10, as set in advance. Therefore, a target drive torque Tsr can be set so that the operator perceives a considerable smoothness, free from unpleasant sensations.

The ratio η of the target drive torque defines the characteristics of the overall target drive torque Tsr output by the vehicle 10. The torque characteristics can be set according to the weighted accelerator position ratio η. Altering the weighting of the accelerator position accordingly makes it possible to change the characteristics of the target drive torque Tsr corresponding to the accelerator position. Consequently, the torque characteristics for a case in which, e.g., one power source is provided, can also be readily used for the torque characteristics of a vehicle 10 having a plurality of drive sources 21, 31L, 31R.

According to the embodiment of the present invention, the drive sources 21, 31L, 31R can be associated with the wheels 11L, 11R, 12R in any configuration. For example, it is possible to adopt a configuration wherein each of the left and right front wheels 11L, 11R is driven by a separate drive source, and the left and right rear wheels 12L, 12R are driven by a single power source. It is also possible to adopt a configuration wherein four drive sources are provided, and each of the four wheels 11L, 11R, 12L, 12R is driven by a separate drive source.

The drive sources 21, 31L, 31R do not have to be electric motors; engines may be used.

The individual critical torque setting parts 61, 62L, 62R, the minimum reference torque setting part 63, and the weight-setting part 81 are not limited to having a configuration wherein a map is used for setting the torque values; a computational expression may also be used.

The "action of the operator" that originates the setting of the target drive torque ratio setting part 80 is not limited to the degree to which the accelerator pedal 53 is depressed by the operator, but may also include, for example, the degree to which the steering wheel is turned by the operator.

The controller 43 may have a microcomputer.

Obviously, various minor changes and modifications of the present invention are possible in light of the above teaching. It is therefore to be understood that within the scope of the appended claims the invention may be practiced otherwise than as specifically described.

What is claimed is:

1. A vehicle drive control method for controlling drive torque of a vehicle, the drive torque generated by a plurality of drive sources that drive a plurality of wheels, the drive torque controlled on the basis of a target drive torque, the method comprising the steps of:
    measuring a vehicle speed;
    measuring an accelerator position of an accelerator pedal;
    individually detecting a rate of rotation of the drive sources;
    individually setting, on a basis of the rate of rotation of each of the drive sources, an individual critical torque to be output by each of the drive sources on an individual basis;
    calculating a minimum reference torque at the rates of rotation when the accelerator pedal is not depressed for each of the drive sources;
    setting, on a basis of the total of the individual critical torques, a total critical torque to be output by the drive sources as a whole by subtracting the minimum reference torque from a total of the individual critical torques; and
    setting a ratio of the target drive torque of the drive sources as a whole to the total critical torque, in response to at least one of an action of an operator and a behavior of the vehicle, wherein setting the ratio of the target drive torque to the total critical torque includes weighting an accelerator position ratio on a basis of the vehicle speed or the accelerator position or both.

2. A vehicle drive control apparatus for controlling drive torque of a vehicle, the drive torque generated by a plurality of drive sources that drive a plurality of wheels, the drive torque controlled on a basis of a target drive torque, the control apparatus comprising:
    a rotation rate detector that detects a rate of rotation of the drive sources individually;
    an individual critical torque setting part that individually sets, on a basis of the rate of rotation of each of the drive sources, an individual critical torque to be output by each of the drive sources;
    a minimum reference torque setting part that sets a minimum reference torque at the rates of rotation when an accelerator pedal is not depressed;
    a total critical torque setting part that sets, on a basis of a total of the individual critical torques, a total critical torque to be output by the drive sources as a whole, the total critical torque setting part including a correction part setting the total critical torque by subtracting the minimum reference torque from the total of the individual critical torques; and
    the target drive torque ratio setting part that sets a ratio of a target drive torque of the drive sources as a whole relative to the total critical torque in accordance with at least one of an action of an operator and a behavior of the vehicle.

* * * * *